United States Patent Office 2,798,095
Patented July 2, 1957

2,798,095

PREPARATION OF α,β-UNSATURATED ALDEHYDES

Otto Isler and Rudolf Rüegg, Basel, Switzerland, assignors to Hoffmann-La Roche Inc., Nutley, N. J., a corporation of New Jersey No Drawing. Application December 31, 1954, Serial No. 479,217

Claims priority, application Switzerland June 18, 1954

11 Claims. (Cl. 260—598)

This invention relates broadly to the preparation of α,β-unsaturated aldehydes. A major object of the invention is to provide an improved process for preparing such aldehydes. Another important object is to provide a process for preparing α,β-unsaturated aldehydes which shall be readily adaptable to commercial scale manufacture, and particularly one which avoids the necessity of resorting to unstable intermediates or dangerous reaction conditions. An additional object of the invention, accordingly, is to provide in a reactive but stable condition the ethinyl ether employed as an intermediate in the process, as will be more fully explained hereinafter. Still another object is the provision of a safe and commercially feasible method for condensing said ethinyl ether with the carbonyl compound employed as a reactant in the process of the invention, as will also be explained hereinafter. Still a further object is the provision of novel α,β-unsaturated aldehydes, made easily accessible by the process herein disclosed, which are useful for a variety of purposes, e. g. in the manufacture of carotenoids.

The process of the invention can be illustrated graphically in terms of the following flow sheet:

FLOW SHEET

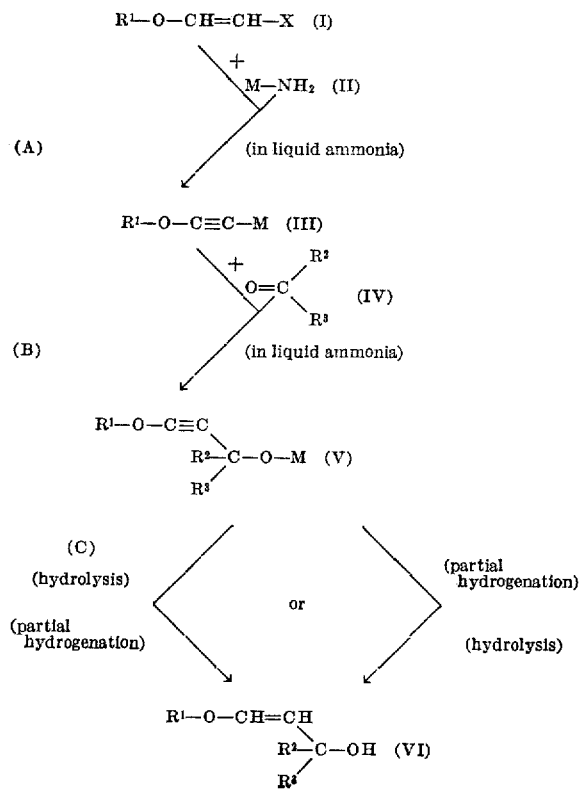

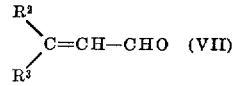

In the above flow sheet:

X represents a halogen, such as chlorine and bromine.

M represents an alkali metal, such as lithium, sodium and potassium.

$R^1$ represents the organic radical of an alcohol or a phenol. Preferred are hydrocarbon radicals having seven or less carbon atoms, e. g. lower alkyl radicals such as methyl and ethyl, and aryl hydrocarbon radicals such as phenyl and tolyl.

$R^2$ represents hydrogen, or a hydrocarbon radical, or a hydrocarbon radical substituted by functional groups. Preferred are hydrogen and aliphatic hydrocarbon radicals.

$R^3$ represents a hydrogen radical, or a hydrocarbon radical substituted by functional groups. Preferred are aliphatic hydrocarbon radicals, cycloaliphatic hydrocarbon radicals, and cycloaliphatic-aliphatic hydrocarbon radicals.

When $R^2$ and $R^3$ both represent hydrocarbon or substituted hydrocarbon radicals, they may be joined to each other, thereby forming a homocyclic ring with the carbonyl carbon atom.

Illustrative embodiments of the β-halovinyl ether reactant represented above by the general Formula I are β-chlorovinyl methyl ether, β-chlorovinyl ethyl ether, β-bromovinyl ethyl ether and β-chlorovinyl phenyl ether.

Illustrative embodiments of the alkali metal amide reactant represented above by the general Formula II are lithium amide, sodium amide and potassium amide.

Illustrative embodiments of the carbonyl compound reactant represented above by the general Formula IV are saturated aliphatic aldehydes, such as propionaldehyde and butyraldehyde; unsaturated aliphatic aldehydes, such as methacrolein, β-methylcrotonaldehyde and citral; cycloaliphatic-aliphatic aldehydes, such as 4-(2,6,6-trimethyl-1-cyclohexen-1-yl)-2-methyl-2-buten-1-al; aromatic aldehydes, such as benzaldehyde; aromatic-aliphatic aldehydes, such as cinnamaldehyde; saturated aliphatic ketones, such as acetone, methyl ethyl ketone and diethyl ketone; unsaturated aliphatic ketones such as mesityl oxide, methylheptenone, dimethylheptenone and pseudoionone; saturated cycloaliphatic ketones such as cyclohexanone and 2,6,6-trimethyl-1-cyclohexanone; unsaturated cycloaliphatic ketones such as cyclohexenone and 2,6,6-trimethyl-2-cyclohexen-1-one; cycloaliphatic-aliphatic ketones such as dihydro-β-ionone, β-ionone and 8-(2,6,6-trimethyl-1-cyclohexen-1-yl)-6-methyl-3,5,7-octatrien-2-one; and aromatic-aliphatic ketones such as acetophenone. Diketones, both saturated and unsaturated, can also be employed for the condensation, such as acetonylacetone and 4-octen-2,7-dione, and likewise saturated and unsaturated dialdehydes, such as succinic acid dialdehyde, 2,7-dimethyl-2,4,6-octatriene-1,8-dial and 2,7-dimethyl-2,6-octadien-4-yne-1,8-dial. Aldehydes and ketones containing functional groups can also be employed for the condensation, e. g. methoxyacetone, levulinic acid, p-dimethylaminobenzaldehyde, p-hydroxybenzaldehyde, androsterone and estrone.

As will be apparent from the above flow sheet, one comprehensive aspect of the invention relates to an improved process of making an α,β-unsaturated aldehyde (VII) which comprises the steps of: (A) reacting a β-halovinyl ether (I) with an alkali metal amide (II)

in liquid ammonia; (B) condensing the thus obtained alkali metal acetylide of an ethinyl ether (III) in liquid ammonia with a carbonyl compound (IV) selected from the group consisting of aldehydes and ketones; (C) converting the acetylenic condensation product obtained (V) to an olefinic carbinol (VI) by a process which comprises successive steps of hydrolysis and partial hydrogenation of the acetylenic bond in said condensation product; and (D) contacting said olefinic carbinol with a liquid acidic medium.

A preferred embodiment of this aspect of the invention relates to a process which comprises the steps of treating a β-halovinyl lower alkyl ether with an alkali metal amide in liquid ammonia, condensing the thus obtained liquid ammonia solution of alkali metal acetylide of ethinyl lower alkyl ether with a carbonyl compound selected from the group consisting of aldehydes and ketones, hydrolyzing the condensation product formed, removing the ammonia, partially hydrogenating the triple bond in the hydrolysis product, and mixing the partial hydrogenation product with a dilute aqueous solution of a mineral acid.

A further aspect of the invention resides in the provision of the ethinyl ether intermediate in a reactive but stable form, as referred to above in the statement of the objects of the invention. This object is attained by the provision of a solution containing essentially an alkali metal acetylide of an ethinyl ether dissolved in liquid ammonia.

Still another aspect of the invention relates to a safe and commercially feasible method for condensing the ethinyl ether reactant with the carbonyl compound reactant, as referred to above in the statement of the objects of the invention. This object is attained by the provision of a process which comprises reacting in liquid ammonia an alkali metal acetylide of an ethinyl ether with a carbonyl compound selected from the group consisting of aldehydes and ketones.

Still another aspect of the invention relates to novel α,β-unsaturated aldehydes which can be produced by the process of the invention and which are useful as intermediates in the synthesis of vitamin A and carotenoids, e. g. 2,6,6-trimethyl-2-cyclohexen-1-ylidene-acetaldehyde and 2,6,6-trimethyl-1-cyclohexylidene-acetaldehyde.

The first stage (A) in the process of the invention comprises the reaction of a β-halovinyl ether with two equivalents of an alkali metal amide in liquid ammonia. One equivalent of the alkali metal amide thereby splits out hydrogen halide from the β-halovinyl ether, with formation of an ethinyl ether, and with simultaneous formation of an alkali metal halide and of ammonia. The second equivalent of the alkali metal amide substitutes the active hydrogen at the triple bond of the ethinyl ether by an atom of the alkali metal, with formation of a second mol of ammonia. The operation of stage (A) can be conducted either in an open vessel at the boiling temperature of ammonia or in a pressure vessel at room temperature. The β-halovinyl ether can be added to a solution of the alkali metal amide in liquid ammonia, which latter can be prepared for instance by dissolving an alkali metal in liquid ammonia. Before addition of the β-halovinyl ether, the latter can be diluted with an inert solvent, for example diethyl ether. A small excess of the β-halovinyl ether may be employed for the reaction. The alkali metal acetylide of the ethinyl ether, resulting from the reaction, is stable in liquid ammonia. It can be employed without isolation for the next stage (B) of condensation with an aldehyde or ketone. The preparation of the alkali metal acetylide of the ethinyl ether is attended with no unusual danger, and gives excellent yields.

The next stage (B) of the process comprises the condensation of the alkali metal acetylide of the ethinyl ether in liquid ammonia with an aldehyde or ketone. It is suitable to conduct this step in the same reaction vessel in which is prepared the liquid ammonia solution of the alkali metal acetylide. Unreacted β-halovinyl ether, and alkali metal halide produced during the first stage, do not interfere with the condensation. Especially suited for this condensation step are those aldehydes and ketones which are stable in liquid ammonia. It is expedient to use the carbonyl compound in an approximately molar equivalent amount to the alkali metal compound. When employing carbonyl compounds which are poorly soluble in liquid ammonia, vigorous stirring is indicated. In addition, in this case it is advantageous to add an inert solvent, e. g. diethyl ether. When dicarbonyl compounds are employed as carbonyl reactants, they are advantageously treated with at least two molar equivalents of the alkali metal acetylide whereby both carbonyl groups enter into the reaction. Whenever the carbonyl reactant contains a free hydroxyl or carboxyl group, as in the case of levulinic acid, p-hydroxybenzaldehyde, androsterone and estrone, an additional mol of the alkali metal amide is employed for each of such free hydroxyl or carboxyl groups. In condensing alkali-sensitive carbonyl compounds, e. g. when using α,β-unsaturated aldehydes as reactant (IV), it is preferable to employ the lithium acetylide of the ethinyl ether as the alkali metal acetylide (III). The condensation product (V) formed in stage (B) is stable in liquid ammonia. It need not be isolated nor purified for further use in the process.

In operating the next stage (C) of the process, the partial hydrogenation of the triple bond can be effected first, for example by addition of sodium or lithium to the ammoniacal solution of the condensation product, or by treating the condensation product, after removal of the ammonia, with sodium in damp ether or with lithium aluminum hydride in dry ether; and then the hydrolysis can be effected, e. g. by treating the hydrogenated product with dilute aqueous acid. The preferred mode of execution, however, comprises hydrolysis of the condensation product in liquid ammonia by addition of an ammonium salt such as ammonium chloride, evaporation of the ammonia, and subsequent partial hydrogenation of the acetylenic carbinol formed. The partial hydrogenation of the acetylenic carbinol is effected according to the methods customarily employed for the selective hydrogenation of the triple bond, as for example by treatment with lithium aluminum hydride in dry ether or by catalytic hydrogenation using palladium catalysts. Especially advantageous is the partial hydrogenation of the acetylenic carbinol in petroleum ether solution in the presence of a palladium-on-calcium carbonate catalyst partially deactivated by means of lead and quinoline, as described by Lindlar, Helvetica Chimica Acta, 35, 446 (1952).

In the final stage (D) of the process, the product of stage (C), which product need not be isolated or purified before further processing, is treated with a liquid acidic medium. (In that mode of execution in which the condensation product (V) is first partially hydrogenated at the triple bond, the step of treating with acid simultaneously effects the hydrolysis of the hydrogenated condensation product as well as the further step of conversion to the final product.) A dilute aqueous solution of a mineral acid, such as hydrochloric acid or sulfuric acid, is suitable for the acid treatment step (D). It is expedient to use a solvent. The preferred mode of execution comprises subjecting the total hydrogenation solution (after removal of the hydrogenation catalyst) directly to the acid treatment. In the acidic medium, there is effected a rearrangement and a splitting off of alcohol, with formation of an α,β-unsaturated aldehyde; apparently an unstable hemiacetal is formed as an intermediate.

The α,β-unsaturated aldehydes obtained are purified by conventional procedures, such as distillation or crystallization. They possess characteristic absorption bands in the ultraviolet and infrared spectrums.

Example 1

To 500 cc. of dry liquid ammonia was added 100 mg. of ferric nitrate, and a few minutes later while stirring 100 mg. of lithium. Dry air was blown into the blue solution for one minute. Then 4.1 g. of lithium was slowly introduced into the solution with a wait after each addition until the blue color of the solution disappeared. 37.5 g. of β-chlorovinyl ethyl ether was introduced with vigorous stirring, and 10 minutes later 51 g. of 4-(2,6,6-trimethyl-1-cyclohexen-1-yl) - 2 - methyl - 2-buten-1-al dissolved in 100 cc. of absolute diethyl ether was dropped in slowly. The mixture was stirred for twenty hours, then reacted slowly with 45 g. of ammonium chloride, and thereupon the ammonia was evaporated. An additional 800 cc. of absolute diethyl ether was then added and the reaction mixture was filtered. The ethereal solution was dried over anhydrous sodium sulfate and the ether was driven off, the residue was dissolved in 600 cc. of high boiling petroleum ether, and after addition of 6 g. of a lead-poisoned palladium catalyst and 3 cc. of quinoline, the mixture was shaken in a hydrogen atmosphere at room temperature. 4.5 liters of hyrogen was taken up. The catalyst was filtered off and the petroleum ether solution was shaken with 300 cc. of water and 30 cc. of 3 N HCl overnight. The petroleum ether layer was then separated and washed with dilute sodium bicarbonate solution and water. After drying over sodium sulfate and removal by distillation of the petroleum ether, the residue was dissolved in 35 cc. of low boiling petroleum ether and cooled to −70° C. 34.0 g. of 6-(2,6,6-trimethyl - 1 - cyclohexen - 1 - yl)-4-methyl-2,4-hexadien-1-al crystallized. M. P. 73–74° C., U. V. max. 274 mμ (ε=31300) (in petroleum ether). Yield, 60 percent.

Example 2

To 500 cc. of dry liquid ammonia was added 100 mg. of ferric nitrate, and a few minutes later while stirring 300 mg. of sodium. Dry air was blown into the blue solution for one minute. Then 13.8 g. of sodium was added slowly in small pieces, with a wait after each addition until the blue color of the solution disappeared. Then 37.5 g. of β-chlorovinyl ethyl ether was added with vigorous stirring, and 10 minutes later 31 g. of 6-methyl-5-hepten-2-one was slowly dropped in. The mixture was stirred for an additional period of 40 hours, then was reacted slowly with 45 g. of ammonium chloride; finally the ammonia was evaporated off. 800 cc. of absolute petroleum ether was added to the residue, and the mixture was filtered. The petroleum ether solution, after drying over sodium sulfate, was concentrated, and the residue was distilled, yielding 26 g. of 1-ethoxy-3-hydroxy-3,7-dimethyl-6-octen-1-yne, B. P. 80° C. at 0.05 mm., and 10 g. of unreacted methylheptenone. The former compound was dissolved in 100 cc. of high boiling petroleum ether, 2 g. of a lead-poisoned palladium catalyst was added, together with 1 cc. of quinoline, and the mixture was shaken in a hydrogen atmosphere while cooling with water. 2.9 liters of hydrogen were taken up. The catalyst was filtered off, the petroleum ether solution was shaken with 200 cc. of water and 20 cc. of 3 N HCl for 45 minutes, the petroleum ether layer was filtered off and washed with dilute sodium bicarbonate solution and water. After drying over sodium sulfate and removal by distillation of the petroleum ether, the residue was distilled, B. P. 102–105° C. at 12 mm. Yield: 16.5 g. of citral, U. V. max. 238.5 mμ (ε=13800) (in ethanol), i. e. 65 percent of theory, taking into account the recovered methylheptenone.

Example 3

To 250 cc. of dry liquid ammonia was added 50 mg. of ferric nitrate, and a few minutes later while stirring 50 mg. of lithium. Dry air was blown into the blue solution for one minute. Then 2.05 g. of lithium was added slowly, with a wait after each addition until the blue color of the solution disappeared. Thereupon 18.75 g. of β-chlorovinyl ethyl ether was added while stirring well, and 10 minutes later 17 g. of 2,6,6-trimethyl-2-cyclohexen-1-one (prepared from 2,6,6-trimethylcyclohexanone by bromination, and then dehydrohalogenating by heating with pyridine) was dropped in slowly. The mixture was stirred for 44 hours, then slowly reacted with 22.5 g. of ammonium chloride, and finally the ammonia was allowed to evaporate. 400 cc. of diethyl ether were then added and the mixture was filtered. The ethereal solution was dried over sodium sulfate, concentrated, and the residue was distilled. 15.8 g. of distillate was obtained, B. P. 85° C. at 0.1 mm. The latter was dissolved in 150 cc. of high boiling petroleum ether and shaken with 5 g. of a lead-poisoned palladium catalyst in a hydrogen atmosphere at room temperature until the hydrogen uptake ceased. The catalyst was filtered off and the petroleum ether solution was shaken with 150 cc. of water and 15 cc. of 3 N HCl for 16 hours at room temperature. Thereupon the petroleum ether solution was separated, washed with dilute sodium bicarbonate solution and water, dried over sodium sulfate, and the solvent was evaporated off. Upon distillation of the residue there was obtained 9.5 g. of 2,6,6-trimethyl-2-cyclohexen-1-ylidene-acetaldehyde of B. P. 112–115° C. at 11 mm.; $n_D^{22.5}$ 1.5353; U. V. max. 278.5 mμ, $E_1^1$ 1840 (in petroleum ether). Phenylsemicarbazone: M. P. 187–188° C.; U. V. max. 308 mμ, $E_1^1$ 1430 (in petroleum ether).

Example 4

This preparation was similar to that described in Example 3 except that 17 g. of 2,6,6-trimethylcyclohexanone was used as starting material in lieu of the ketone used in Example 3. After hydrogenation the catalyst was filtered off, the petroleum ether solution was concentrated, and the residue was shaken for 1½ hours at room temperature with a mixture of 100 cc. of dioxane, 17.5 cc. of 3 N H₂SO₄ and 7.5 cc. of water. Thereupon the mixture was diluted with water, the product was taken up in petroleum ether, and the petroleum ether solution was washed with dilute sodium bicarbonate solution and water, dried over sodium sulfate, and concentrated. Upon distillation of the residue there was obtained 8.5 g. of 2,6,6-trimethyl-1-cyclohexylidene-acetaldehyde of B. P. 102° C. at 11 mm.; $n_D^{23}$ 1.4938; U. V. max. 237 mμ, $E_1^1$ 617 (in petroleum ether). Phenylsemicarbazone: M. P. 129–130.5° C.; U. V. max. 241 mμ, $E_1^1$ 635; 284.5 mμ, $E_1^1$ 555 (in petroleum ether).

2,6,6-trimethyl-1-cyclohexylidene-acetaldehyde is useful as an intermediate in the synthesis of carotenoids. Thus, as disclosed hereinafter (in Example 7) this compound can be converted to 4-(2,6,6-trimethyl-1-cyclohexylidene)-2-methyl-2-buten-1-al. The latter can be condensed with isopropenyl acetate in the presence of p-toluene-sulfonic acid, while distilling off the acetone formed, to yield 4-(2,6,6-trimethyl-1-cyclohexenyl)-2-methyl-1-acetoxy-1,3-butadiene. Hydrolysis of the latter with aqueous-alcoholic KOH yields the known compound 4 - (2,6,6 - trimethyl - 1 - cyclohexen - 1 - yl) - 2 - methyl-2-buten-1-al, an intermediate in a known synthesis of vitamin A.

Example 5

To 250 cc. of dry liquid ammonia was added 50 mg. of ferric nitrate and a few minutes later while stirring 100 mg. of lithium. Dry air was blown into the blue solution for one minute. Then 2.05 g. of lithium was added slowly with a wait after each addition until the blue color of the solution disappeared. Thereupon 18.75 g. of β-chlorovinyl ethyl ether was added while stirring well, and 10 minutes later 25.5 g. of 4-(2,6,6-trimethyl-2-cyclohexen-1-ylidene)-2-methyl-2-buten-1-al (prepared by brominating 4-(2,6,6-trimethyl-1-cyclohexen-1-yl)-2-methyl-2-buten-1-al with N-bromosuccinimide and then dehydrobrominating by heating with quinoline) dissolved in 50 cc. of absolute diethyl ether was slowly dropped in. The mixture was stirred for 20 hours, then slowly reacted with 22.5 g. of ammonium chloride, following which the ammonia was allowed to evaporate. 600 cc. of diethyl ether was added and the mixture was filtered. The ethereal solution was dried over sodium sulfate and the ether was driven off. The residue was taken up in 200 cc. of high boiling petroleum ether and shaken with 4 g. of a lead-poisoned palladium catalyst at 20° C. in a hydrogen atmosphere until the hydrogen uptake ceased. After filtering off the catalyst the petroleum ether was shaken with 150 cc. of water and 15 cc. of 3 N HCl for 16 hours at room temperature. Then the petroleum ether solution was separated, washed with dilute sodium bicarbonate solution and water, dried over sodium sulfate and concentrated. Upon distillation of the residue there was obtained 22 g. of a crude product having a boiling point of 120–125° C. at 0.02 mm., U. V. max. 352 m$\mu$, $E_1^1$ 1560 and 368 m$\mu$, $E_1^1$ 1330 (in petroleum ether). This product was a mixture of isomeric forms of 6 - (2,6,6 - trimethyl - 2 - cyclohexen - 1 - ylidene) - 4-methyl-2,4-hexadien-1-al. By crystallization from petroleum ether at —70° C. there was obtained a form consisting of compact yellow prisms of melting point 73–74° C., U. V. max. 353 m$\mu$, $E_1^1$ 2360 and 372 m$\mu$, $E_1^1$ 2200 (in petroleum ether). The phenylsemicarbazone prepared from this material formed orange colored crystals, M. P. 184–186° C., U. V. max. 366 m$\mu$, $E_1^1$ 2330 and 386 m$\mu$, $E_1^1$ 2160 (in petroleum ether). The oily portion of the crude product yielded a yellow phenylsemicarbazone, M. P. 164–166° C., U. V. max. 362 m$\mu$, $E_1^1$ 2140 and 382 m$\mu$, $E_1^1$ 1800 (in petroleum ether). The oily isomer was partially transformed into the crystalline isomer by heating for 5 hours at 100° C. with acetic acid and sodium acetate; by repeated treatment of the mother liquors almost the entire amount was obtained as a crystalline isomer.

*Example 6*

This preparation was similar to that described in Example 5 except that 25.5 g. of 4-(2,6,6-trimethyl-1,3-cyclohexadien-1-yl)-2-methyl-2-buten-1-al was employed as starting material in lieu of the aldehyde used in Example 5. There was thus obtained 17 g. of a distillate of 6 - (2,6,6 - trimethyl - 1,3 - cyclohexadien - 1 - yl) - 4-methyl-2,4-hexadien-1-al, which was crystallized from 35 cc. of petroleum ether at —70° C.; B. P. 115° C. at 0.02 mm.; M. P. 18–22° C.; U. V. max. 274 m$\mu$, $E_1^1$ 1380 (in petroleum ether). Phenylsemicarbazone: B. P. 183–185° C., U. .V max. 307 m$\mu$, $E_1^1$ 1580.

The starting material was prepared as follows: $\beta$-ionone was subjected to a glycide ester synthesis with ethyl chloroacetate, and the glycide ester was treated with alkali to produce 4-(2,6,6-trimethyl-1-cyclohexen-1-yl)-2-methyl-2-buten-1-al. The latter was brominated with N-bromosuccinimide, and the bromination product was treated with quinoline to split out HBr thereby yielding 4 - (2,6,6 - trimethyl - 2 - cyclohexen - 1 - ylidene) - 2-methyl-2-buten-1-al. The latter compound was reacted with isopropenyl acetate in the presence of p-toluenesulfonic acid while distilling off liberated acetone, thereby producing 4 - (2,6,6 - trimethyl - 1,3 - cyclohexadien - 1-yl)-2-methyl-1-acetoxy-1,3-butadiene. The latter was hydrolyzed by treatment with sodium bicarbonate in aqueous methanol, thereby producing the desired starting material 4 - ( 2,6,6 - trimethyl - 1,3 - cyclohexadien - 1-yl)-2-methyl-2-buten-1-al, B. P. 80° C. at 0.05 mm., $n_D^{22}$ 1.530.

*Example 7*

This preparation is similar to that described in Example 5, except that the starting material employed here was 25.5 g. of 4-(2,6,6-trimethyl-1-cyclohexylidene)-2-methyl-2-buten-1-al. There was obtained a distillate of 6-(2,6,6-trimethyl - 1 - cyclohexylidene) - 4 - methyl - 2,4 - hexadien-1-al of boiling point 115° C. at 0.03 mm. This contained a little 6-(2,6,6-trimethyl-1-cyclohexen-1-yl)-4-methyl-2,4-hexadien-1-al, which was separated by chromatography on aluminum oxide. The pure product crystallized from petroleum ether in yellowish crystals, M. P. 61–62° C., U. V. max. 323 m$\mu$, $E_1^1$ 1960 and 334 m$\mu$, $E_1^1$ 1925 (in petroleum ether). Phenylsemicarbazone: M. P. 181–183° C., U. V. max. 341 m$\mu$, $E_1^1$ 1620 and 357 m$\mu$, $E_1^1$ 1550 (in petroleum ether).

The starting material was prepared as follows: 2,6,6-trimethyl-cyclohexylidene-acetaldehyde (prepared according to Example 4) was acetalized by reaction with orthoformic acid triethyl ester in the presence of p-toluenesulfonic acid, thereby forming 2,6,6-trimethyl-cyclohexylidene-acetaldehyde diethyl acetal. The latter was condensed with ethyl propenyl ether in the presence of zinc chloride thereby forming 4-(2,6,6-trimethyl-1-cyclohexylidene) - 2 - methyl - 1,1,3 - triethoxy - butane. Upon hydrolysis-dealcoholation of the latter by heating with acetic acid and sodium acetate to 100° C., the desired starting material 4-(2,6,6-trimethyl-1-cyclohexylidene)-2-methyl-2-buten-1-al was formed.

We claim:

1. A process of making an $\alpha,\beta$-unsaturated aldehyde which comprises the steps of reacting a $\beta$-halovinyl ether with an alkali metal amide in liquid ammonia, condensing the thus obtained alkali metal acetylide of an ethinyl ether in liquid ammonia with a carbonyl compound selected from the group consisting of aldehydes and ketones, converting the acetylenic condensation product obtained to an olefinic carbinol by a process which comprises successive steps of hydrolysis and partial hydrogenation of the acetylenic bond in said condensation product, and contacting said olefinic carbinol with a liquid acidic medium.

2. A process which comprises treating a $\beta$-halovinyl lower alkyl ether with an alkali metal amide in liquid ammonia, condensing the thus obtained liquid ammonia solution of alkali metal acetylide of ethinyl lower alkyl ether with a carbonyl compound selected from the group consisting of aldehydes and ketones, hydrolyzing the condensation product formed, removing the ammonia, partially hydrogenating the triple bond in the hydrolysis product, and mixing the partial hydrogenation product with a dilute aqueous solution of a mineral acid.

3. A solution containing essentially an alkali metal acetylide of an ethinyl ether dissolved in liquid ammonia.

4. A process of making a solution according to claim 3 which comprises reacting a $\beta$-halovinyl ether with an alkali metal amide in liquid ammonia.

5. A process which comprises reacting an alkali metal acetylide of an ethinyl ether with an aldehyde in liquid ammonia.

6. A process which comprises reacting in liquid ammonia an aldehyde of the formula RCHO, wherein R represents a cycloaliphatic-aliphatic hydrocarbon radical, with an alkali metal acetylide of an ethinyl lower alkyl ether.

7. A process which comprises reacting an alkali metal acetylide of an ethinyl ether with a ketone in liquid ammonia.

8. A process which comprises reacting in liquid ammonia an alkenone with an alkali metal acetylide of an ethinyl lower alkyl ether.

9. A solution containing essentially lithium acetylide of ethinyl ethyl ether dissolved in liquid ammonia.

10. A solution containing essentially sodium acetylide of ethinyl ethyl ether dissolved in liquid ammonia.

11. A solution containing essentially an alkali metal acetylide of an ethinyl lower alkyl ether dissolved in liquid ammonia.

References Cited in the file of this patent

UNITED STATES PATENTS

| | | |
|---|---|---|
| 2,628,979 | Arens | Feb. 17, 1953 |
| 2,705,728 | Inhoffen | Apr. 5, 1955 |

OTHER REFERENCES

Henbest et al.: J. Chem. Soc., 1952, 1150–4.

UNITED STATES PATENT OFFICE

CERTIFICATE OF CORRECTION

Patent No. 2,798,095             July 2, 1957

Otto Isler et al.

It is hereby certified that error appears in the printed specification of the above numbered patent requiring correction and that the said Letters Patent should read as corrected below.

Column 2, line 21, for "hydrogen" read -- hydrocarbon --; column 4, line 74, the printed matter beginning with "The" indented as a new paragraph is erroneous and should be flush with the line above and the line below; column 5, line 25, for the syllable "hyro-" read -- hydro- --; column 6, line 55, for "synthsis" read -- synthesis --; column 10, line 4, list of references cited, under UNITED STATES PATENTS, for "Arens" read -- Arens et al. --.

Signed and sealed this 13th day of August 1957.

(SEAL)
Attest:
KARL H. AXLINE

Attesting Officer

ROBERT C. WATSON
Commissioner of Patents

UNITED STATES PATENT OFFICE

CERTIFICATE OF CORRECTION

July 2, 1957

Patent No. 2,798,095

Otto Isler et al.

It is hereby certified that error appears in the above numbered patent requiring correction and that the said Letters Patent should read as corrected below.

In the heading to the printed specification, line 9, for "Claims priority, application Switzerland June 18, 1954" read -- Claims priority, application Switzerland January 18, 1954--.

Signed and sealed this 1st day of October 1957.

(SEAL)
Attest:

KARL H. AXLINE
Attesting Officer

ROBERT C. WATSON
Commissioner of Patents